United States Patent

[11] 3,576,211

[72] Inventor Robert J. Goodwin
 Oakmont, Pa.
[21] Appl. No. 880,060
[22] Filed Nov. 26, 1969
[45] Patented Apr. 27, 1971
[73] Assignee Gulf Research & Development Company
 Pittsburgh, Pa.

[54] METHOD FOR PLACING CEMENT AROUND CASING
 8 Claims, 3 Drawing Figs.
[52] U.S. Cl. .................................................. 166/290
[51] Int. Cl. .............................................. E21b 33/14
[50] Field of Search .......................................... 166/285, 290, 173

[56] References Cited
 UNITED STATES PATENTS
2,107,327 2/1938 Creighton .................. 166/290
2,416,842 3/1947 O'Leary ..................... 166/290X
2,421,434 6/1947 Reistle et al. ................ 166/173
3,417,816 12/1968 Morris et al. ................ 166/290

Primary Examiner—Ian A. Calvert
Attorneys—Meyer Neishloss, Deane E. Keith and Paul L. Tillson ABSTRACT: Casing to be set in a well is lowered to a position just above the interval of the well in which cementing is critical. Small diameter tubing having scratchers mounted on its outer surface is lowered through the casing and reciprocated vigorously while circulating liquid to remove soft filter cake and cuttings from the borehole wall through the critical area. A cement slurry is pumped down the tubing to puddle cement slurry in the bottom of the borehole. The casing is then lowered into the puddled cement slurry. A float valve on the lower end of the casing causes the cement slurry to be displaced up into the annulus surrounding the casing.

PATENTED APR 27 1971 3,576,211
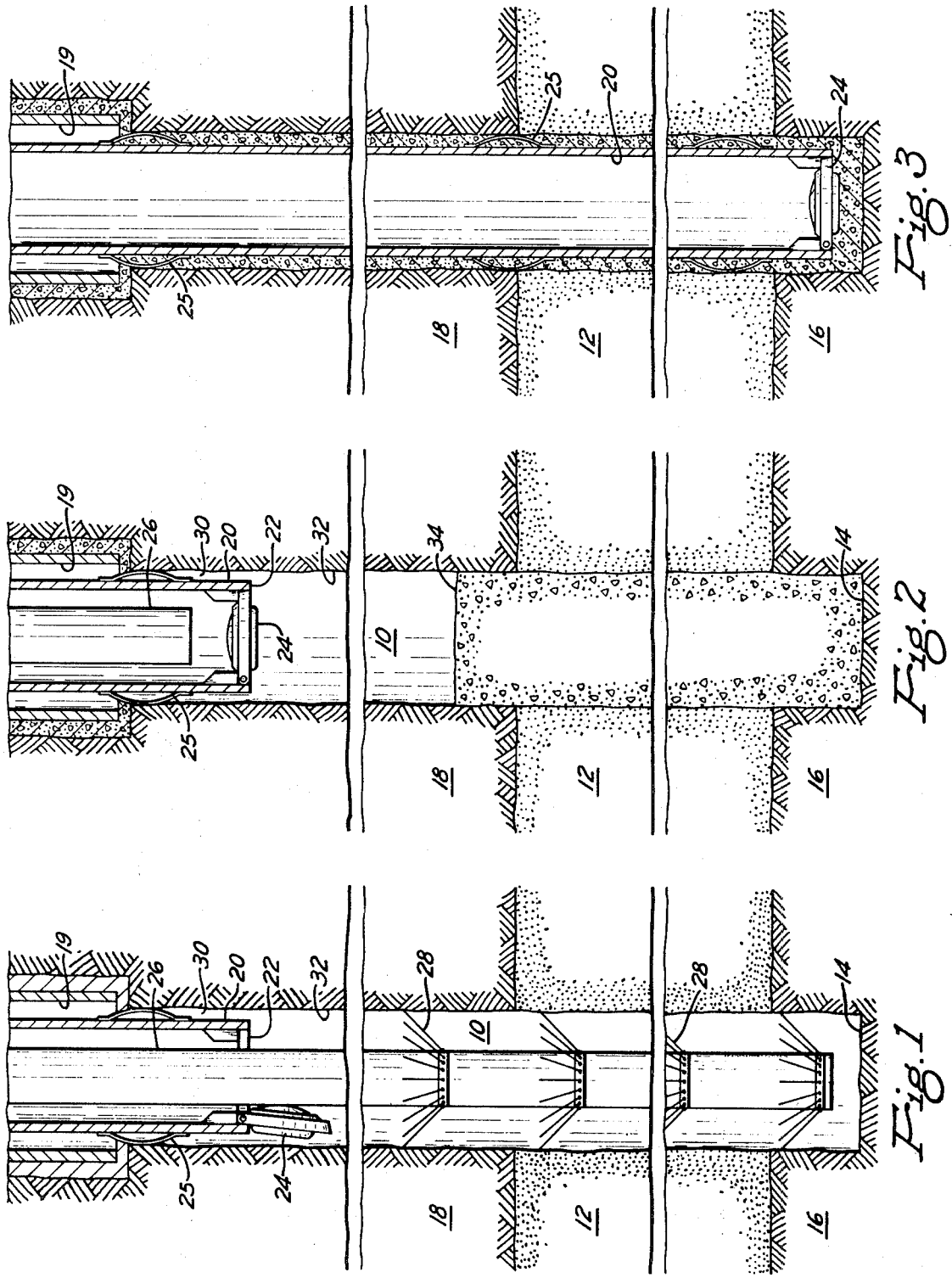
INVENTOR.
ROBERT J. GOODWIN

METHOD FOR PLACING CEMENT AROUND CASING

This invention relates to wells for the production of fluids from subsurface formations and more particularly to a method of cementing casing in wells.

It is the usual practice in drilling wells for the production of oil and gas to set several concentric strings of casing in the well. Each string of casing extends deeper in the well than the next larger string of casing. The casing program is designed to isolate certain formations penetrated by the well from other formations. After a string of casing is lowered into the well a cement slurry is pumped down the casing and forced upwardly through the annulus between the casing and the borehole wall. The casing is suspended in the well until the cement sets to form a solid sheath filling the annulus surrounding the casing. The cement sheath is designed to seal the annular space between the casing and the borehole wall and thereby prevent flow of gas or oil into water-bearing formations penetrated by the well or water into gas- and oil-bearing formations. Slurries of Portland cement are usually used to form the desired cement sheath in the annulus surrounding the casing.

Often the cement sheath does not completely fill the annular space between the outer surface of the casing and the borehole wall, and the cement then does not isolate successive formations in the manner desired. One reason for unsatisfactory cement jobs is the tendency of the cement slurry to channel through the space surrounding the casing when the cement slurry is pumped down the casing and displaced upwardly through the annulus surrounding the casing. Unsatisfactory cementing jobs are also caused by the drilling mud filter cake on the borehole wall at the end of the drilling operation preventing adherence of cement to the borehole wall.

Some operators have specified that scratchers be attached to the outer surface of the casing and the casing vigorously moved either by reciprocating or rotating while cement is pumped into place. The scratchers are designed to scrape soft mud cake and loose cuttings from the borehole wall and in conjunction with the vigorous movement of the casing is believed to prevent channeling through the annulus between the casing and the borehole wall. It has been found in the field that as a practical matter a thorough scratcher job by rotation or reciprocation of casing is rarely accomplished. Rig crews are reluctant to reciprocate large casing rapidly enough to prevent channeling and cause the removal of the cuttings and drilling mud filter cake necessary to obtain a strong bond of the cement to the borehole wall. Moreover, the very strong plunger effect resulting from reciprocation of casing may fracture the well or reduce the hydrostatic pressure in the well to such an extent that gas enters the well and causes a blowout.

To eliminate the disadvantages of conventional cementing methods it has been suggested that the cement slurry be puddled in the bottom of the borehole and casing then run into the puddled cement. If the cement is delivered into the bottom of the borehole through small diameter tubing having scratchers attached to its outer surface and the tubing reciprocated vigorously while circulating liquids in the hole, both drilling mud and mud filter cake can be effectively removed from the critical area and a uniform cement sheath strongly adhering to the borehole wall can be obtained. Rig crews do not object to rapid reciprocation of small diameter tubing such as drill pipe. However, the time required to run casing into the well after placement of the cement makes it necessary to use highly retarded cements to avoid setting of the cement before the casing is in place, and such retardation may cause excessive time waiting on cement.

This invention resides in a method of cementing casing in a well in which casing is run into the borehole to a depth such that the lower end of the casing is just above the level to which a strong uniform cement sheath is required. A small diameter pipe having scratchers on its outer surface is run through the casing and the float valve and reciprocated or rotated vigorously while a liquid is pumped through it to remove drilling mud and mud filter cake from the hole. When returns at the surface indicate that the borehole is clean the desired amount of cement is pumped down the small diameter pipe and discharged therefrom into the bottom of the hole while reciprocation and/or movement of the small diameter pipe is continued. The small diameter pipe is then withdrawn, and the casing lowered into the cement slurry and suspended in the cement until the cement sets.

Referring to the drawings:

FIG. 1 is a diagrammatic view partially in vertical section of the lower end of a borehole treated in accordance with this invention during the period of cleaning the borehole for the cementing operation.

FIG. 2 is a diagrammatic view partially in vertical section showing the well after placement of the cement in its lower end.

FIG. 3 is a diagrammatic view partially in vertical section showing the well at the end of the cementing operation.

Referring to FIG. 1 of the drawings, the lower end of the borehole 10 of a well is illustrated penetrating a productive fluid-bearing formation 12 and extending to a total depth 14 in a formation 16 underlying formation 12. A formation 18 overlies formation 12. The lower end of a previously set string of casing 19 is shown set in the overlying formation 18. It is desired to set a string of casing 20 in the well with the cement sheath surrounding the casing 20 through formations 16 and 12 and upwardly through formation 18 for an interval insuring isolation of formation 12 from overlying formations after the cementing operation is completed.

Casing 20 is run into the well to a depth placing the lower end 22 of the casing to be cemented just above the critical interval through which a continuous cement sheath is desired. Mounted on the lower end of casing 20 is a float valve 24 illustrated as being of the flapper type adapted to close the lower end of the casing 20 as it is run into the well and during subsequent steps in this cementing process. Casing 20 has centralizers 25 along its length to keep the casing away from the borehole wall.

A small diameter tubing 26, which may be drill pipe, is run into the well through casing 20 and downwardly through float valve 24. Tubing 26 should have a diameter less than about 50 percent of the diameter of borehole 10. Small diameter tubing 26 has a plurality of scratchers 28 mounted at intervals along its outer surface illustrated in the drawings as the type operated by reciprocation of the tubing. Other types of scratchers can be used. After small diameter tubing 26 has been run to a depth placing the uppermost scratchers 28 below the float valve 24 a distance such that the scratchers will not engage the float valve during the scratching operation and the lower end below the formation 12, the small diameter tubing 26 is reciprocated while a liquid is pumped downwardly through the tubing 26 into the bottom of the borehole and displaced upwardly through the annulus 30 between the outer surface of casing 20 and the borehole wall 32. It is preferred that suitable sealing means, not shown, be provided in casing 20, preferably at its upper end, to engage the outer surface of tubing 26 and thereby force the displaced liquid to move up through the annulus 30. Reciprocation of the tubing 26 should be through a stroke long enough to insure scratching of the borehole wall through the entire interval through which a strong bond is essential. Circulation and reciprocation can be continued for any desired length of time. It is preferred to continue the circulation until returns at the surface indicate that soft filter cake and loose cuttings on the borehole wall have been removed over the area scratched. Any liquid can be circulated to accomplish the desired borehole wall cleaning. While a drilling mud can be used and is quite often necessary, it is preferred to use a clear liquid to avoid building additional filter cake during the scratching operation.

After the borehole wall is clean a cement slurry is pumped down through small diameter tubing 26 and discharged into the lower end of the borehole while, preferably, continuing reciprocation of the tubing. The volume of cement pumped into the hole will depend upon the length of the interval to be cemented. In FIG. 2 the volume of cement is illustrated as filling the borehole to the level 34. After the desired volume of cement has been displaced into the hole, the small diameter tubing is withdrawn through the casing, and the casing is lowered to the desired depth in the well below the formation 12. The float valve on the lower end of the casing prevents entry of cement into the casing whereupon lowering of the casing displaces cement upwardly through the annulus surrounding the casing. Since the float valve is not necessary until the casing is lowered into the puddled cement slurry, float valve 24 may be of a type that can be lowered into position on a wire line after small diameter tubing 26 has been pulled from the well. Casing 20 is then suspended in the well until the cement in the annulus sets.

Cement slurry fills the annulus above the level 34 in the same manner as in conventional cementing operations, but the annulus through the critical interval is freed of drilling mud and drilling mud solids by this invention. This cementing method insures a good bond throughout the interval in which a good cementing job is required by removing the mud filter cake and any liquid mud from the borehole throughout the interval in which a good bond is required. The positioning, before the placement of cement, of the lower end of the casing immediately above the interval in which a good bond is required allows the casing to be quickly lowered into the desired final position after the cement has been delivered into the hole, and thereby makes unnecessary extensive retarding of the cement. It is then not necessary to conduct further steps designed to trigger the setting of a highly retarded cement to avoid excessive loss of rig time while waiting for the cement to set.

The location of the lower end of the casing during scratching and placement of the cement will depend on the conditions in the particular well. If, for example, formation 12 is a very high-pressure formation, it may be desirable to insure removal of drilling mud and mud filter cake from the borehole for an interval of 1,000 feet above the upper boundary of the critical formation, but in other wells shorter intervals as small as 50 feet may be adequate. In any event, the time required to run the casing to the desired final depth after placement of the cement can be greatly reduced by running the casing to just above the critical interval before placement of the cement. It is then not necessary to retard the setting of the cement greatly, and the danger of overretarding the cement is eliminated.

In some wells, particularly deep wells, there will be intermediate strings of casing that extend substantial distances down the well. The casing to be set by the process of this invention can advantageously be suspended in the well with its lower end at or just slightly above the lower end of the next larger string of casing during the scratching, circulating, and cement puddling operations. In that manner all chances of the casing becoming stuck during those operations can be avoided. While the reduction in the time required to lower the casing to its final position may be lessened, important reductions in time are still possible if the intermediate string of casing goes to a substantial depth, and this embodiment is particularly advantageous when the intermediate casing extends for a depth of 3,000 feet or more.

I claim:

1. A method of cementing casing in the borehole of a well comprising running casing into the borehole and suspending the casing with its lower end a short distance above the interval of the borehole in which cementing is critical and not substantially higher than the lower end of the next larger string of casing, running small diameter tubing having scratchers on its outer surface through the casing into the borehole below the casing, circulating a liquid down through the tubing into the borehole of the well near the bottom of the well and up the well while moving the tubing to remove drilling mud and drilling mud filter cake from the critical interval of the borehole, discharging from the small diameter tubing into the lower end of the borehole a cement slurry in an amount which will be sufficient to fill the annular space between the casing and the borehole wall through the desired interval, withdrawing the small diameter tubing through the casing and closing the lower end of the casing, lowering the casing into the cement slurry to the desired depth in the borehole, and maintaining the casing at the desired depth until the cement sets.

2. A method as set forth in claim 1 in which the casing is initially suspended with its lower end at least 50 feet above a fluid-bearing formation to be isolated by the casing.

3. A method as set forth in claim 1 in which the cement slurry is a slurry of Portland cement.

4. A method as set forth in claim 1 in which the small diameter tubing is reciprocated in the hole to scratch the borehole wall through the entire critical interval.

5. A method as set forth in claim 1 in which the small diameter tubing is rotated, and the scratchers are adapted to scratch the borehole wall through the critical area on rotation of the small diameter tubing.

6. A method as set forth in claim 1 in which the small diameter tubing is drill pipe.

7. A method as set forth in claim 1 in which centralizers are mounted on the casing at intervals over that portion of the casing opposite the borehole wall.

8. A method of cementing casing in a well the borehole of which extends a substantial distance below intermediate casing extending at least 3,000 feet into the well comprising running the casing into the intermediate casing to locate the lower end of the casing at substantially the depth of the lower end of the intermediate casing, running small diameter tubing having scratchers mounted on its outer surface through the casing and into the borehole below the intermediate casing, circulating liquid through the small diameter tubing while moving the small diameter tubing through the interval of the borehole in which cementing of the casing is critical to remove cuttings and mud filter cake from that interval of the borehole, discharging from the small diameter tubing into the lower end of the borehole a cement slurry in an amount which will be sufficient to fill the annular space between the casing and the borehole wall through the desired interval, pulling the small diameter tubing from the well and closing the lower end of the casing, lowering the casing into the cement slurry to the desired position in the well, and suspending the casing at the desired position until the cement sets.